United States Patent
Qiang et al.

(10) Patent No.: US 10,249,338 B2
(45) Date of Patent: *Apr. 2, 2019

(54) SHINGLED MAGNETIC RECORDING STORAGE SYSTEM DURING VIBRATION

(71) Applicant: Seagate Technology LLC, Cupertino, CA (US)

(72) Inventors: Jian Qiang, Singapore (SG); Xiong Liu, Singapore (SG)

(73) Assignee: SEAGATE TECHNOLOGY, LLC, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/952,754

(22) Filed: Apr. 13, 2018

(65) Prior Publication Data
US 2018/0322902 A1    Nov. 8, 2018

Related U.S. Application Data

(63) Continuation of application No. 15/589,795, filed on May 8, 2017, now Pat. No. 9,972,353.

(51) Int. Cl.
| G11B 20/12 | (2006.01) |
| G11B 27/36 | (2006.01) |
| G11B 20/18 | (2006.01) |
| G11B 20/10 | (2006.01) |

(52) U.S. Cl.
CPC .......... *G11B 20/1217* (2013.01); *G11B 20/18* (2013.01); *G11B 27/36* (2013.01); *G11B 2020/10916* (2013.01); *G11B 2020/1238* (2013.01); *G11B 2220/2516* (2013.01)

(58) Field of Classification Search
None
See application file for complete search history.

(56) References Cited

U.S. PATENT DOCUMENTS

| 5,036,505 | A | 7/1991 | Gleim |
| 8,315,006 | B1 | 11/2012 | Chahwan et al. |
| 8,947,817 | B1 | 2/2015 | Chung et al. |
| 9,087,540 | B1* | 7/2015 | Lee .................. G11B 5/59627 |
| 9,099,155 | B1 | 8/2015 | Kataria et al. |
| 9,236,073 | B1 | 1/2016 | Liu et al. |
| 9,269,376 | B1 | 2/2016 | Hess et al. |
| 9,373,347 | B2 | 6/2016 | Kim et al. |
| 9,431,061 | B1* | 8/2016 | Slik .................. G11B 27/36 |
| 9,495,988 | B1 | 11/2016 | Liu et al. |
| 9,607,633 | B1 | 3/2017 | Toribio et al. |
| 9,972,353 | B1* | 5/2018 | Qiang .................. G11B 20/1217 |

(Continued)

*Primary Examiner* — Tan X Dinh
(74) *Attorney, Agent, or Firm* — Holzer Patel Drennan

(57) ABSTRACT

The disclosed technology provides a method that improves SMR throughput in vibration in storage systems. In one implementation, the method comprises receiving a write command to write data on a first track in a band of a storage medium, performing a vibration detection scheme to identify vibration events, determining if a number of vibration events is above a predetermined threshold, skipping the first track responsive to determining the number of vibration events is above a predetermined threshold, seeking to a second track adjacent to the first track, increasing an OCLIM on the second track adjacent to the first track from a default OCLIM to an increased OCLIM, and shifting the writer center on the second track adjacent to the first track.

20 Claims, 6 Drawing Sheets

(56) References Cited

U.S. PATENT DOCUMENTS

| | | |
|---|---|---|
| 2005/0213446 A1 | 9/2005 | Tanaka et al. |
| 2014/0055883 A1* | 2/2014 | Dhanda .................... G11B 5/09 360/77.08 |
| 2014/0177085 A1 | 6/2014 | Haga et al. |
| 2015/0109700 A1 | 4/2015 | Kashiwase et al. |
| 2015/0279395 A1* | 10/2015 | Kim .................... G11B 5/5582 360/78.08 |
| 2015/0294684 A1 | 10/2015 | Qiang et al. |
| 2016/0034342 A1* | 2/2016 | Toh .................... G06F 11/1044 714/721 |
| 2016/0372143 A1 | 12/2016 | Qiang et al. |
| 2017/0097877 A1* | 4/2017 | Dhanda ................ G11B 5/5582 |

\* cited by examiner ic recording (SMR).

SHINGLED MAGNETIC RECORDING STORAGE SYSTEM DURING VIBRATION

PRIORITY CLAIM

The present application is a continuation application of U.S. patent application Ser. No. 15/589,795 filed May 8, 2017 and titled "Shingled Magnetic Recording Storage System During Vibration," which is hereby incorporated by reference in its entirety.

BACKGROUND

As requirements for data storage density increase for magnetic media, cell size decreases. A commensurate decrease in the size of a write element is difficult because in many systems, a strong write field gradient is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is shingled magnetic recording (SMR).

SMR allows for increased areal density capability (ADC) as compared to conventional magnetic recording (CMR) but at the cost of some performance ability. As used herein, CMR refers to a system that allows for random data writes to available cells anywhere on a magnetic media. In contrast to CMR systems, SMR systems are designed to utilize a write element with a write width that is larger than a defined track pitch. As a result, changing a single data cell within a data track entails re-writing a corresponding group of shingled (e.g., sequentially increasing or decreasing) data tracks.

SUMMARY

In one implementation, this disclosure provides a system receiving a write command to write data on a first track in a band of a storage medium, performing a vibration detection scheme to identify vibration events, determining if a number of vibration events is above a predetermined threshold, skipping the first track responsive to determining the number of vibration events is above a predetermined threshold, seeking to a second track adjacent to the first track, increasing an OCLIM on the second track adjacent to the first track from a default OCLIM to an increased OCLIM, and shifting the writer center on the second track adjacent to the first track.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
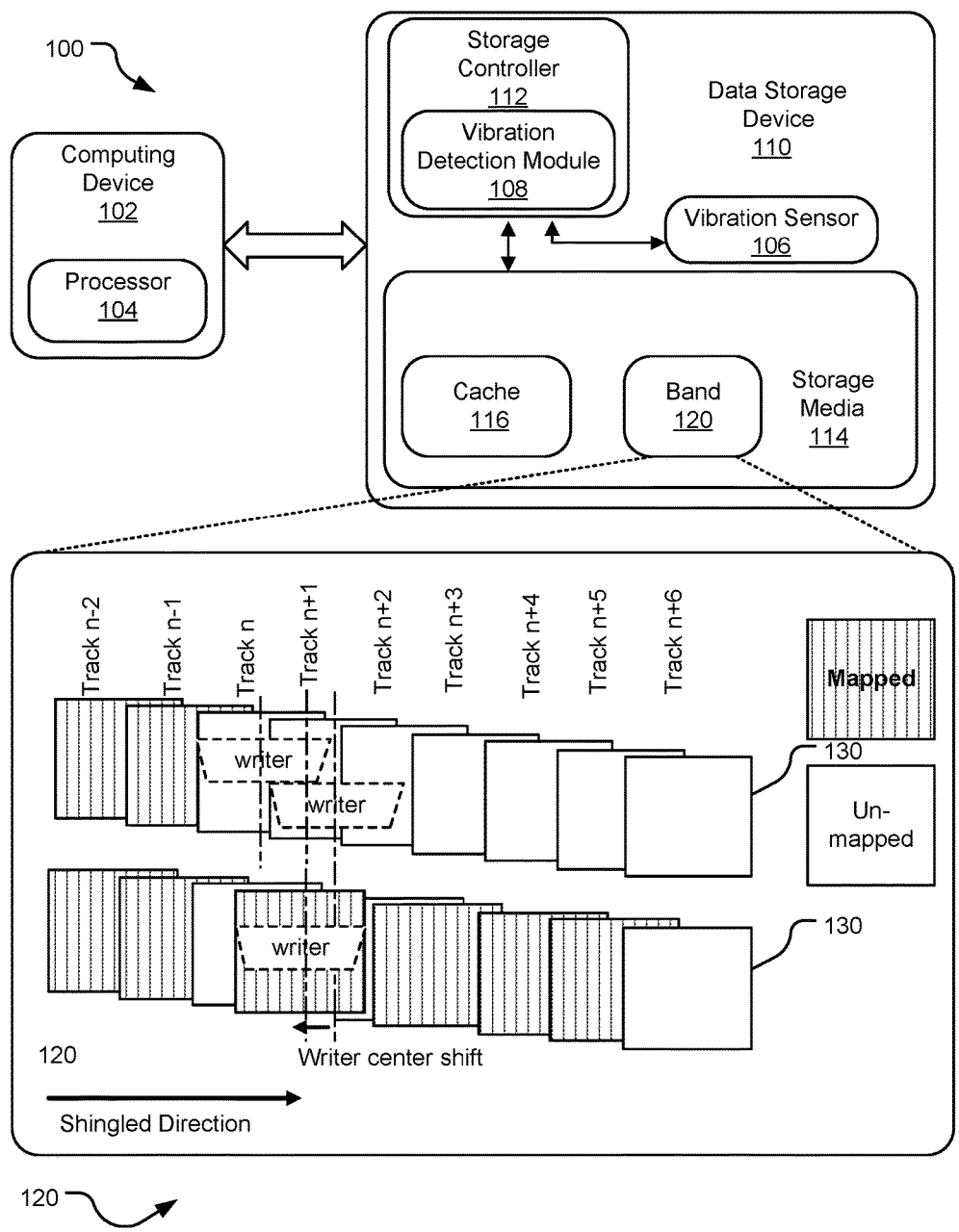
FIG. 1 is a block diagram of an example SMR data storage system.

As used herein, the term "disturbance" refers to changes affecting an environment within a storage device including, for example, vibration. A disturbance may be caused by forces external or internal to the storage device.

Disturbances such as impact shock and vibration can be a cause of problems in hard drive disc systems, particularly during write operations. If a disturbance occurs while data is being written to a storage medium, a write element may be knocked off of a target data track. As a result, data may be recorded incorrectly or become corrupted. Disturbances may be caused by a variety of forces, such as a user playing loud music from a laptop computer, vibrations due to cooling fans turning on or off, or external impact forces absorbed by an electronic device.

If a disturbance occurs while data is being written to a storage medium, data may be recorded incorrectly or become corrupted. In some recording systems, storage space is statically mapped so that each data block (e.g., a sector) is associated with a logical address assigned by a host computer. In these types of systems, a write operation affected by a disturbance can be retried at the statically mapped location until the write succeeds. However, write retries are time consuming, and may take a full spin period or revolution time of a magnetic media in the storage medium. If the frequency of disturbance-related write errors is large, throughput performance can decrease. These challenges are magnified in shingled magnetic recording (SMR) systems. An SMR drive is a storage device that uses bands of overlapping tracks to increase storage density. In SMR, a new track may be written that partially overlaps a previously written track, creating a shingled aspect to the tracks. SMR leverages the fact that a width of a read head is typically narrower than the width of a write head. The storage density of an SMR drive is increased over conventional drives because the previously written tracks are thinner, allowing for higher track density. In an SMR drive, a set of bands of overlapping tracks may be separated by an isolation space, which serves to reduce the number of tracks that need to be rewritten when a shingled track is rewritten. In SMR, a write element may be large enough to affect two adjacent data tracks on a single pass. If the write element is displaced from a target position by vibrations, adjacent tracks on either side of a target track can be affected.

The present disclosure is directed to data storage systems that improve SMR throughput in vibration. The disclosed method includes detecting vibration in an SMR drive and skipping an unmapped track so that an on-cylinder limit (OCLIM) may be increased when dynamically writing to an adjacent track. The OCLIM may be defined as the off-track limit, which is pre-determined during drive design. When a writer position from the track center (position error signals) is greater than OCLIM, the writing operation may be stopped. In some implementations, the range of OCLIM is approximately 7-14% track pitch. In some implementations, the unit of OCLIM may be a minch. For example, 0.1 minch.

More particularly, the present disclosure is directed to data storage systems and devices that perform a vibration determination scheme that detects vibration via a vibration sensor. A write operation can skip a current unmapped track and start writing on an adjacent track if vibration is detected. Since the adjacent track is unmapped, the write is shifted so that an OCLIM can be increased, reducing disc retry and improving throughput. When vibration is no longer detected on the drive, the drive will stop skipping tracks and will proceed with a default OCLIM.

The technology disclosed herein can be used with various data storage devices. Examples of such data storage devices include hard disc drives, solid state hybrid drives, solid state media such as NAND, NVRAM, Resistive RAM (ReRAM), Magnetic RAM (MRAM), Phase Change Memory (PCM), and other memory technologies.

In the following description, reference is made to the accompanying drawing that forms a part hereof and in which are shown by way of illustration at least one specific embodiment. In the drawing, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a block diagram of an example data storage system 100, showing various functional components used to control the operation of a data storage device 110 (e.g., an SMR HDD, an SMR SSHD, an object storage device, etc.).

The data storage system 100 includes a computing or computing device 102 (e.g., a computer, a mobile device, the internet, etc.) operably connected to the data storage device 110, each of the computing device 102 and the data storage device 110 communicating with each other.

A processor 104 is located in the computing device 102. The processor 104 sends one or more read or write commands to a storage device controller 112 for execution. As control communication paths are provided between a computing device 102 and the storage device controller 112, the storage device controller 112 provides communication and control for the data storage device 110.

A storage media 114 located in the data storage device 110 may be one or more of a variety of tangible media (excluding carrier waves and communication signals), including hard disk drives and solid state hybrid drives, store data on magnetic media, as well as optical media, solid state media such as NAND, NVRAM, Resistive RAM (ReRAM), Magnetic RAM (MRAM), Phase Change Memory (PCM), and other advanced and staid memory technologies.

The data storage device 110 further includes a cache 116 that is either a storage area on the storage media 114 or another non-volatile memory accessible by the data storage device 110. In the depicted system 100, the cache 116 is a storage area on the storage media 114.

A band (e.g., a band 120) of shingled tracks (e.g., a shingled track 130) may also be located in the storage media 114. In FIG. 1, the shingled tracks 130 located in the band 120 are shown. An implementation of the shingled tracks 130 is arranged such that when data is written to one of the shingled tracks 130 (except for the last data track), a writing operation affects data on an adjacent track in a down-track direction.

In SMR drives, to prevent off-track write encroachment on adjacent shingled tracks 130, an OCLIM may be reduced so that ADC gain may be improved. However, by reducing an OCLIM, many disc retries may occur which decreases a drive's throughput due to adverse effects, such as large position error signals (e.g., a music test).

On certain media partitions with dynamic address mapping (e.g., a media cache), one side of a target location is unmapped. In one implementation of the disclosed technology, with dynamic mapping, a write operation can skip a current track (e.g., track n) and start writing on an adjacent track (e.g., track n+1) if vibration is detected. Specifically, the storage device controller 112 receives a write command to write data on a first track in the band 120. Vibration may be detected from a vibration sensor 106 (or shock sensor) in the data storage device or from position error signals (PES). The vibration sensor 106 detects the shock between two servo wedges to stop the write operation anytime when shock happens. PES also can be considered a kind of vibration sensor, but not continuous. A vibration detection module 108 performs a vibration detection scheme to identify a number of vibration events, by identifying the number of triggers of the vibration sensor 106 or an OCLIM within one revolution. If there is only one trigger, it may have occurred accidently. In some implementations, the number of servo wedges is approximately 400. One sigma of PES is approximately 3% track pitch without vibration. Each triggered event requires one more revolution to complete the write operation. In some implementations, a threshold should be around 5 trigger of PES overshoots (off-track write) in one track transfer. If the track pitch is too small, a media cache may become full due to skipping to many tracks. If the track pitch is too large, there may be a performance drop and the requirement for command complete time may not be met. For example, to demonstrate the correlation of 1 sigma PES value (in % of track pitch) and number of PES overshoot, when a measurement for 1 sigma PES is 4% track pitch, then approximately 5 PES overshoot will occur in 1 track transfer (while the drive may need to retry write for 5 times).

If the number of vibration events is above a predetermined threshold, the first track (e.g., track n) is skipped and designated as a "skipped track" in a mapping table (not shown). Once a track is designated as a skipped track in the mapping table, the host will not be able to access the skipped track. In some implementations, an SMR drive may have a cleaning or garbage collection operation which will recycle the skipped tracks and make them usable again.

The storage device controller 112 seeks to a second track (track n+1) adjacent to the first track n. Since the adjacent track n+1 is unmapped, the OCLIM on the second track n+1 adjacent to the first track n is increased from a default OCLIM to an increased OCLIM and the writer center on the second track n+1 adjacent to the first track n is shifted. Data is written on the second track n+1 adjacent to the first track n. When the vibration detection scheme determines that there is no more vibration detected, the SMR drive stops skipping tracks and proceeds with a default OCLIM.

Figure 2:
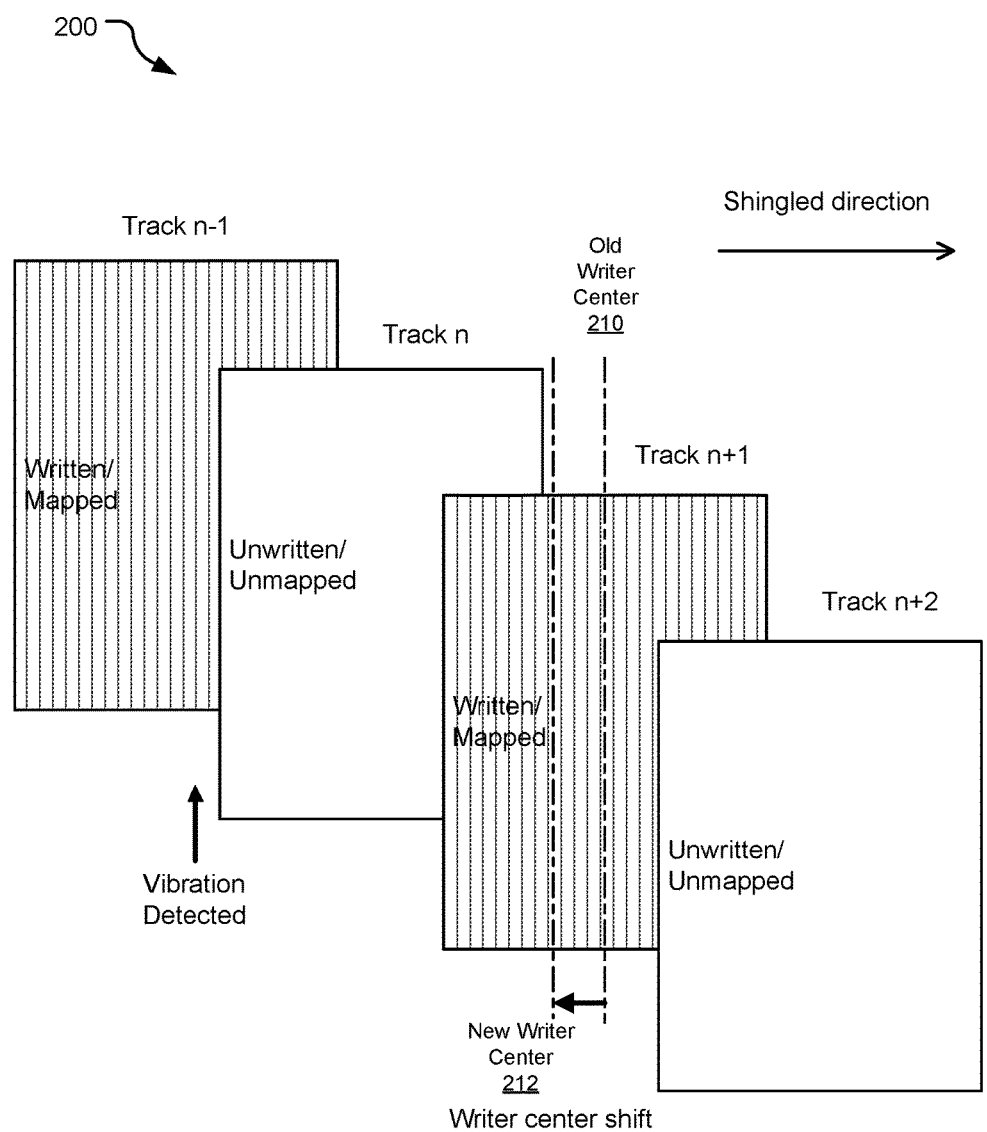
FIG. 2 is a schematic diagram of an example shingled tracks of a dynamic mapping partition in an SMR data storage system.

FIG. 2 is a schematic diagram of example tracks in a dynamic mapping partition in an SMR data storage system 200. A partition with dynamic track mapping is shown. Four tracks are shown: a track n−1, a track n, a track n+1, and a track n+2. The track n−1 may be partially mapped or fully mapped. In FIG. 2, track n−1 is fully mapped. The track n is adjacent to track n−1. In FIG. 2, the track n is unmapped.

A write operation can skip a current track (e.g., the track n) and start writing on an adjacent track (e.g., the track n+1)

if vibration is detected. A storage device controller (not shown) receives a write command to write data on a first track in the band. Vibration may be detected from a vibration sensor or shock sensor) in the data storage device or from PES. The vibration sensor detects the shock between two servo wedges to stop the write operation anytime when shock happens. A vibration detection module performs a vibration detection scheme to identify a number of vibration events.

If the number of vibration events is above a predetermined threshold, the first track (e.g., track n) is skipped. The storage device controller seeks to a second track (track n+1) adjacent to the first track n.

The track n+1 may be partially mapped or fully mapped. In FIG. 2, the track n+1 is fully mapped. If the track n+2 is fully mapped, track n+1 must be fully mapped. In FIG. 2, the track n+2 is unmapped. There must be no vibration or other disturbances before completing writing track n+1 if there are mapped segments on the track n+2. Otherwise, the next mapped segments should be on track n+3 (not shown).

In some implementations, the adjacent track n+1 is unmapped, and the OCLIM on the second track n+1 adjacent to the first track n is increased from a default OCLIM to an increased OCLIM and the writer center on the second track n+1 adjacent to the first track n is shifted from an old writer center 210 to a new writer center 212. Data is written on the second track n+1 adjacent to the first track n. When the vibration detection scheme determines that there is no more vibration detected, the SMR drive stops skipping tracks and proceeds with a default OCLIM.

Figure 3:
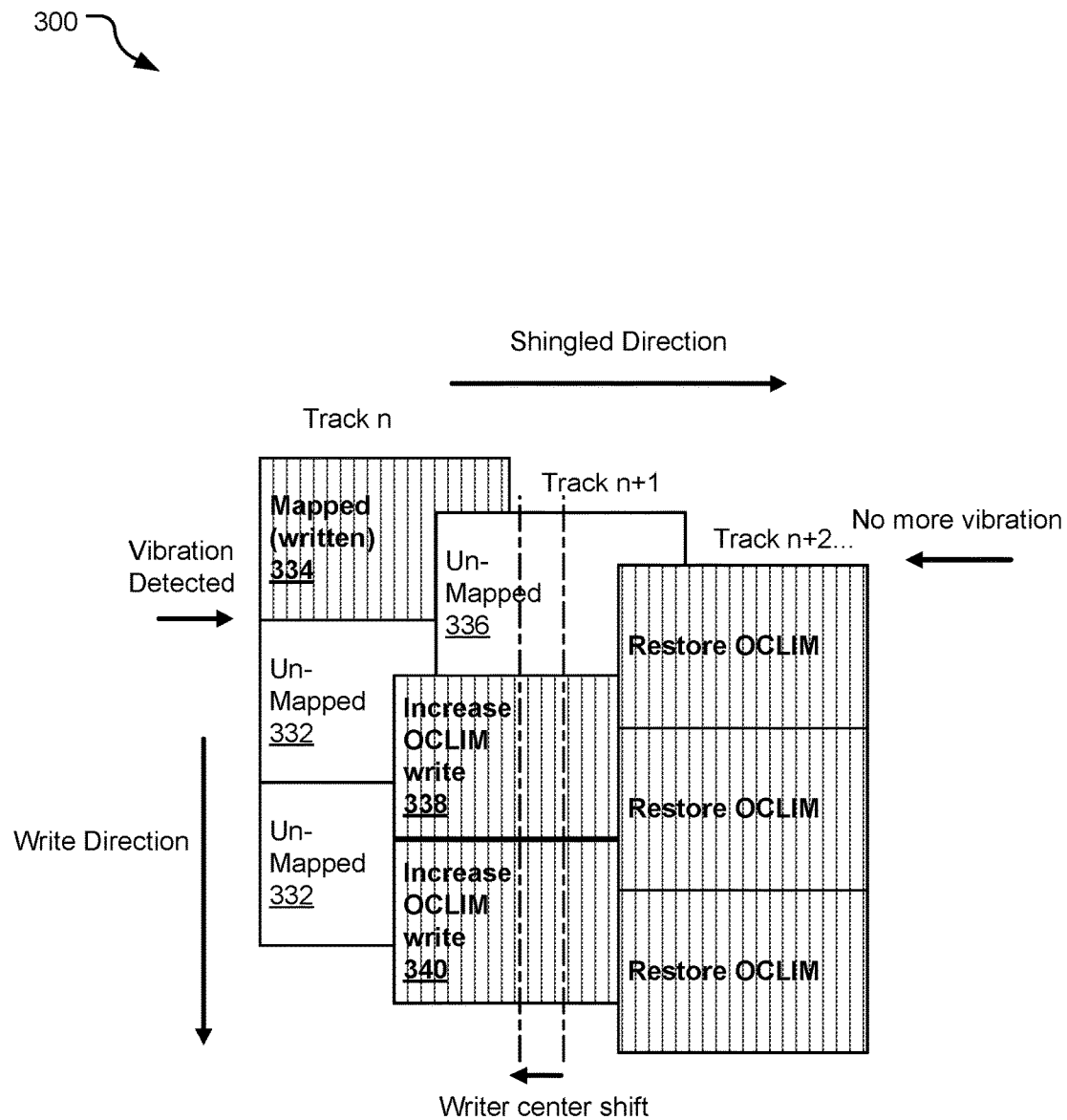
FIG. 3 is a schematic diagram of an example shingled tracks of a segment based dynamic mapping partition in an SMR data storage system.

FIG. 3 is a schematic diagram of an example tracks in a segment based dynamic mapping partition in an SMR data storage system 300. In the implementation of FIG. 3, a partition may have segment-based dynamic mapping (e.g., a media cache). As shown in FIG. 3, a track (e.g., track n+1) can have multiple segments (e.g., segments 336, 338, and 340). In FIG. 3, tracks n, n+1, and n+2 have three segments each.

In one implementation, when vibration is sensed by a vibration sensor, and a number of vibration events are determined via a vibration determination scheme to be above a predetermined threshold, multiple unmapped segments (e.g., unmapped segments 332) of a track (e.g., track n) can be skipped so that a default OCLIM may be increased without erasing the mapped segment (e.g., mapped segment 334). The OCLIM may be increased and the writer shifted The storage controller seeks to a second track (track n+1) adjacent to the first track n. Since a segment of the adjacent track n+1 is unmapped (e.g., segment 336), the OCLIM on the second track n+1 adjacent to the first track n is increased from a default OCLIM to an increased OCLIM and the writer center on the second track n+1 adjacent to the first track n is shifted. Data is written on the unmapped segment 336 on the second track n+1 adjacent to the first track n. When the vibration detection scheme determines that there is no more vibration detected, the SMR drive stops skipping segments of the tracks and proceeds with a default OCLIM and writes to the next adjacent track (e.g., track n+2), which has mapped segments with a restored default OCLIM.

Figure 4:
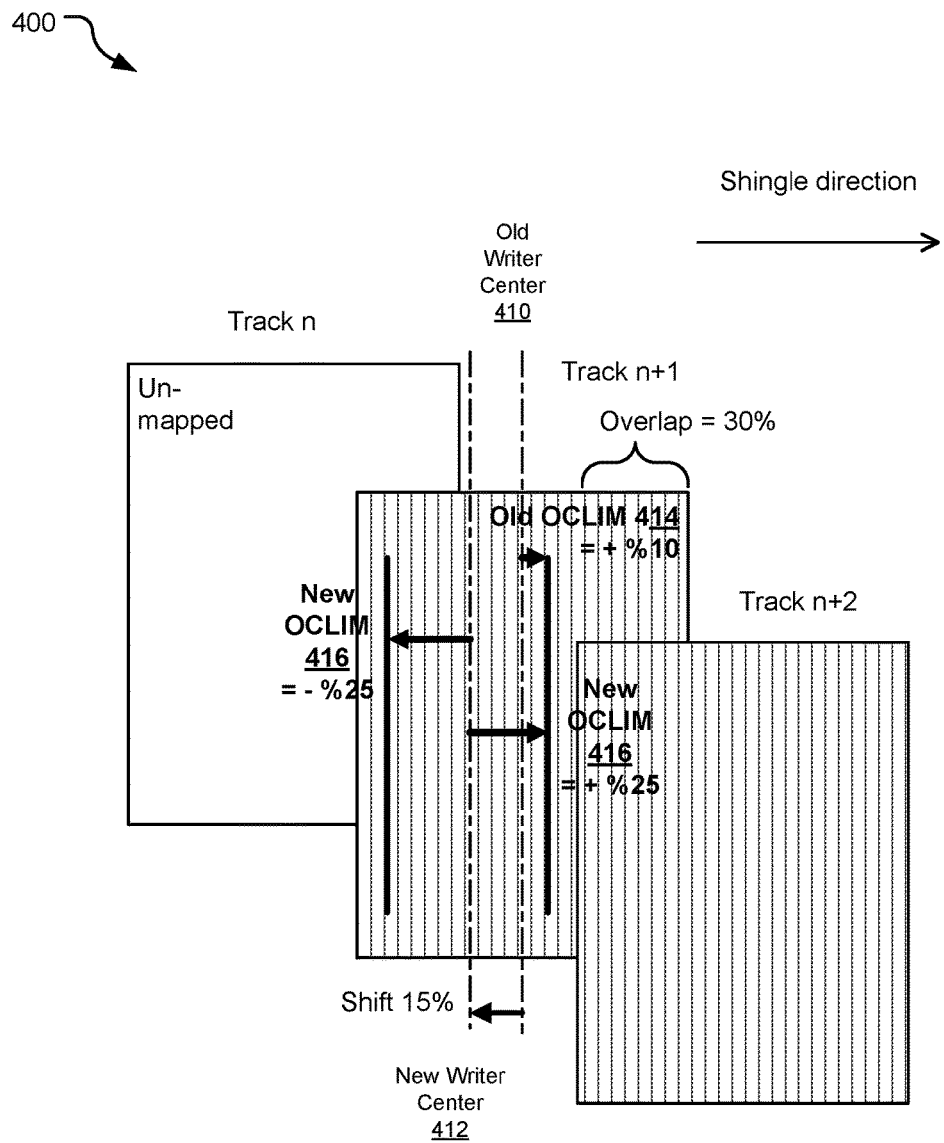
FIG. 4 is a schematic diagram of an example shingled tracks of a dynamic mapping partition in an SMR data storage system.

FIG. 4 is schematic diagram of an example tracks in a media cache partition in an SMR data storage system 400. In the implementation of FIG. 4, a writer center on a track (e.g., track n+1) may be shifted to align with a track center (depicted in dotted lines showing change of position from "old writer center 410" to "new writer center 412").

For example, if an SMR track overlap of a track (e.g., track n+1) in a media cache partition is 30%, then a default OCLIM 414 may be increased to an increased OCLIM 416. A default OCLIM 414 may be 10% and a writer center may be shifted 15%, resulting in an increased new OCLIM 316 of 25%. If a default OCLIM 414 is increased from 10% to 25%, the number of disc retries may be greatly reduced.

Figure 5:
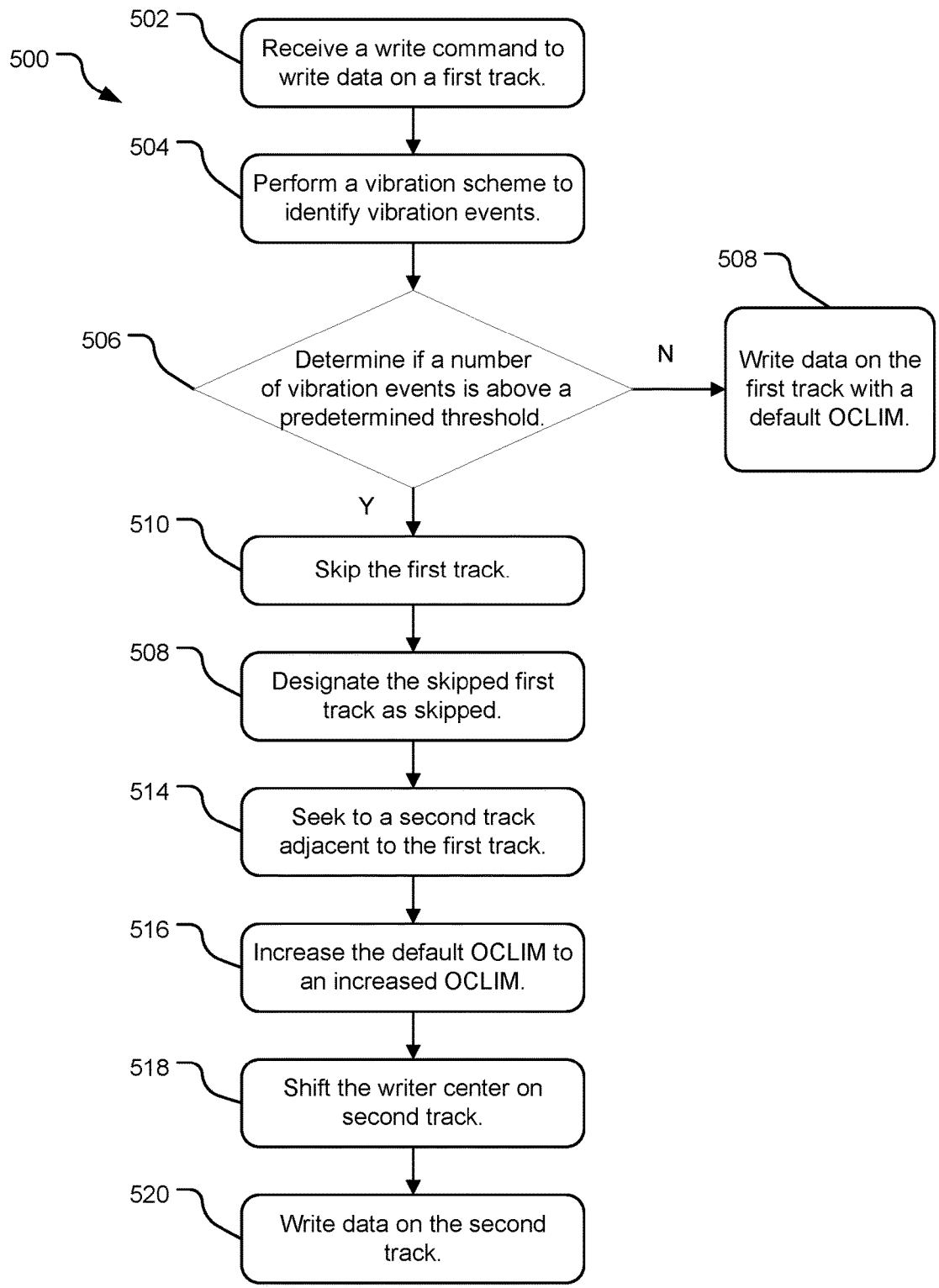
FIG. 5 is a flowchart of example operations for an improved throughput process in an SMR data storage system.

FIG. 5 is a flowchart of example operations 500 for an improved throughput process in an SMR data storage system. An operation 502 receives a write command to write data on a first track in a band of a storage medium. An operation 504 performs a vibration detection scheme to identify vibration events. An operation 506 determines if a number of vibration events is above a predetermined threshold.

If the operation 506 determines the number of vibration events is below a predetermined threshold, an operation 508 writes data on the first track with a default OCLIM.

If the operation 506 determines a number of vibration events is above a predetermined threshold, an operation 510 skips the first track. An operation 512 designates the skipped first track as skipped in a mapping table. An operation 514 seeks to a second track adjacent to the first track. An operation 516 increases an OCLIM on the second track adjacent to the first track from a default OCLIM to an increased OCLIM (e.g., from a 10% default OCLIM to an 25% increased OCLIM).

An operation 518 shifts the writer center on the second track adjacent to the first track. An operation 520 writes data on the second track adjacent to the first track. In some implementations, subsequent operations include performing a vibration detection scheme to identify vibration events on the second track adjacent to the first track, and so on.

Figure 6:
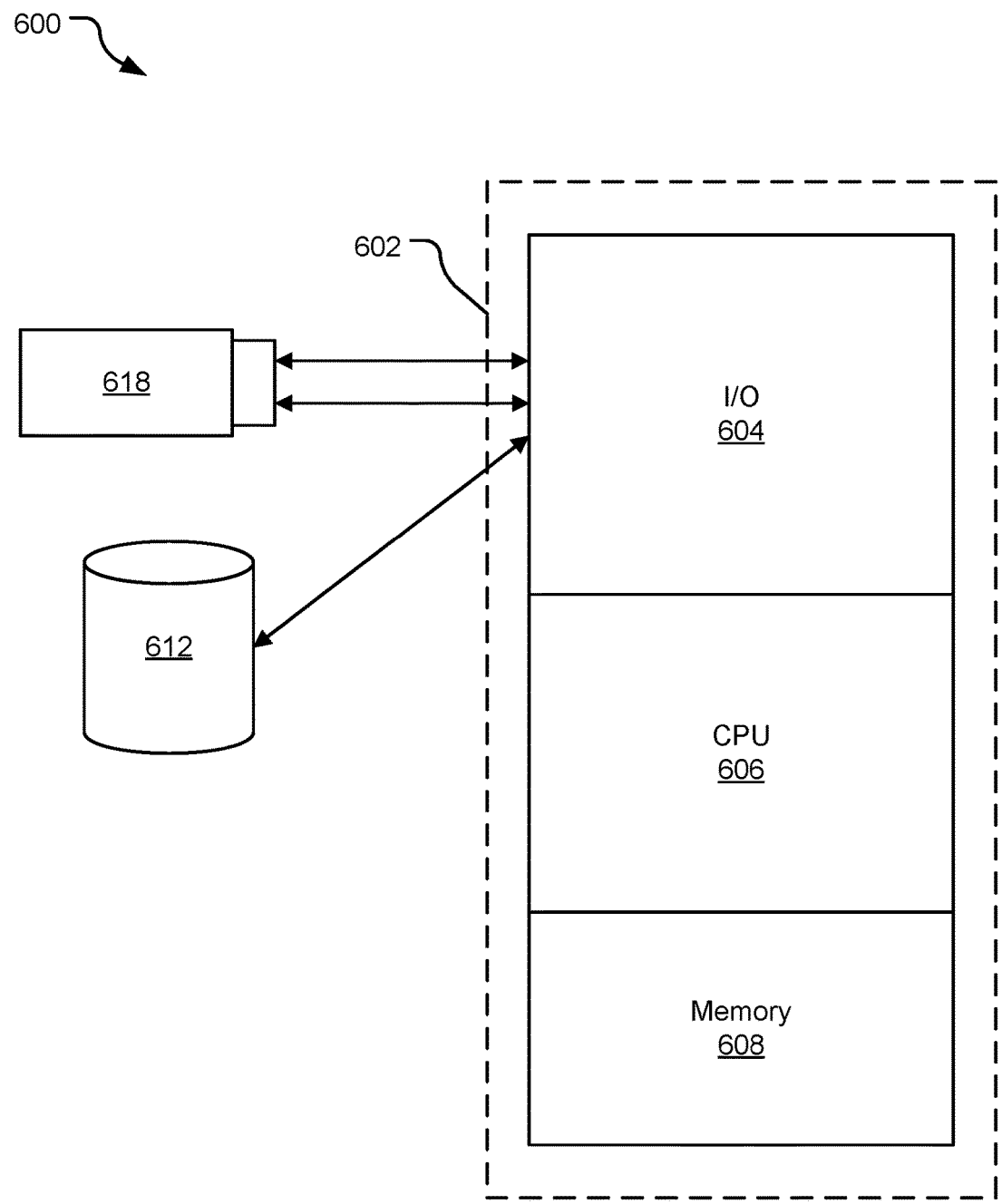
FIG. 6 is a block diagram of an example computer system suitable for implementing the technology disclosed herein.

FIG. 6 discloses a block diagram of a computer system 600 suitable for implementing the improved SMR throughput process. Computer system 600 is capable of executing a computer program product embodied in a tangible computer-readable storage medium to execute a computer process. The tangible computer-readable storage medium is not embodied in a carrier-wave or other signal. Data and program files may be input to computer system 600, which reads the files and executes the programs therein using one or more processors. Some of the elements of a computer system are shown in FIG. 5, where a processor 602 is shown having an input/output (I/O) section 604, a Central Processing Unit (CPU) 606, and a memory 608. There may be one or more processors 602, such that processor 602 of system 600 has a single central-processing unit or a plurality of processing units. System 600 further includes a controller, not shown in FIG. 6, configured to designate a plurality of non-contiguous storage areas on the storage media as media scratch pads; the controller may be software, firmware, or a combination thereof. System 600 may be a conventional computer, a distributed computer, or any other type of computer. The described technology is optionally implemented in software loaded in memory 608, a disc storage unit 612, or removable memory 618.

In an example implementation, the process of increasing SMR throughput may be embodied by instructions stored in memory 508 and/or disc storage unit 512 and executed by CPU 506. Further, local computing system, remote data sources and/or services, and other associated logic represent firmware, hardware, and/or software which may be configured to adaptively distribute workload tasks to improve system performance. The use of the media scratch pad may be implemented using a general purpose computer and specialized software (such as a server executing service software), and a special purpose computing system and specialized software (such as a mobile device or network appliance executing service software), or other computing configurations. In addition, program data, such as dynamic allocation threshold requirements and other information may be stored in memory 508 and/or disc storage unit 512 and executed by processor 502.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. The above description provides specific embodiments. It is to be understood that other embodiments are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   receiving a write command to write data on a first track in a band of a storage medium;
   skipping the first track responsive to determining a number of vibration events is above a vibration predetermined threshold;
   seeking to a second track adjacent to the first track; and
   increasing an on-cylinder limit (OCLIM) on the second track adjacent to the first track from a default OCLIM to an increased OCLIM.

2. The method of claim 1, further comprising:
   writing data on the first track with the default OCLIM responsive to determining a frequency of vibration events is below a predetermined frequency threshold.

3. The method of claim 1, further comprising:
   performing a vibration detection scheme to identify vibration events; and
   determining if a number of vibration events is above a predetermined vibration threshold.

4. The method of claim 1, wherein determining a frequency of vibration events is below a predetermined frequency threshold is responsive to determining no vibration is detected.

5. The method of claim 1, further comprising:
   designating the skipped first track as skipped in a mapping table.

6. The method of claim 1, further comprising:
   shifting a writer center on the second track adjacent to the first track.

7. The method of claim 1, further comprising:
   writing data on the second track adjacent to the first track.

8. A storage device system, comprising:
   a storage controller configured to:
   receive a write command to write data to a first track in a band of a storage medium;
   seek to a first track in the band;
   skip the first track responsive to determining a number of vibration events is above a vibration predetermined threshold; and
   increase an on-cylinder limit (OCLIM) on a second track from a default OCLIM to an increased OCLIM by a predetermined amount.

9. The storage device system of claim 8, further comprising:
   a vibration sensor configured to detect vibration in a storage device.

10. The storage device system of claim 8, wherein the storage medium includes a media cache with segment-based dynamic mapping and the storage controller is configured to skip at least one unmapped segment on a track in the band.

11. The storage device system of claim 8, wherein the storage medium is a shingled magnetic recording storage medium.

12. The storage device system of claim 8, wherein the storage controller is further configured to shift a writer center on the second track adjacent to the first track.

13. The storage device system of claim 8, wherein the storage controller is further configured to write data on the second track adjacent to the first track.

14. The storage device system of claim 8, wherein the storage controller is further configured to write data on the first track with a default OCLIM responsive to determining a frequency of vibration events is below a predetermined threshold.

15. The storage device system of claim 8, wherein the storage controller is further configured to:
   perform a vibration detection scheme via vibration detection module to identify a number of vibration events detected by the vibration sensor;

determine if the number of vibration events is above a predetermined threshold;

skip to a second track adjacent to the first track responsive to determining the number of vibration events is above a predetermined threshold; and increase the on-cylinder limit (OCLIM) on the first track from a default OCLIM to an increased OCLIM.

16. The storage device system of claim 15, wherein the storage controller is further configured to designate a skipped track as skipped in a mapping table.

17. One or more non-transitory computer-readable storage media encoding computer-executable instructions for executing on a computer system a computer process, the computer process comprising:

receiving a write command to write data on a first track in a band of a storage medium;

skipping the first track responsive to determining a number of vibration events is above a vibration predetermined threshold;

seeking to a second track adjacent to the first track; and increasing an on-cylinder limit (OCLIM) on the second track adjacent to the first track from a default OCLIM to an increased OCLIM.

18. The one or more non-transitory computer-readable storage media of claim 17, further comprising:

performing a vibration detection scheme to identify vibration events; and determining if a number of vibration events is above a predetermined vibration threshold.

19. The one or more non-transitory computer-readable storage media of claim 17, further comprising designating the skipped first track as skipped in a mapping table.

20. The one or more non-transitory computer-readable storage media of claim 17, further comprising shifting a writer center on the second track adjacent to the first track.

* * * * *